(12) United States Patent
Wei

(10) Patent No.: US 10,816,856 B2
(45) Date of Patent: Oct. 27, 2020

(54) PHOTO-ALIGNMENT MATERIAL, LIQUID CRYSTAL DISPLAY PANEL, AND MANUFACTURING METHOD THEREOF

(71) Applicant: Shenzhen China Star Optoelectronics Technology Co., Ltd., Shenzhen (CN)

(72) Inventor: Hongquan Wei, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 12 days.

(21) Appl. No.: 16/114,171

(22) Filed: Aug. 27, 2018

(65) Prior Publication Data
US 2019/0265554 A1 Aug. 29, 2019

Related U.S. Application Data

(63) Continuation of application No. PCT/CN2018/083360, filed on Apr. 17, 2018.

(30) Foreign Application Priority Data

Feb. 27, 2018 (CN) .......................... 2018 1 0164129

(51) Int. Cl.
*G02F 1/1337* (2006.01)
*G02F 1/1333* (2006.01)
*C09K 19/56* (2006.01)

(52) U.S. Cl.
CPC ........ *G02F 1/133723* (2013.01); *C09K 19/56* (2013.01); *G02F 2001/133354* (2013.01); *Y10T 428/10* (2015.01); *Y10T 428/1005* (2015.01); *Y10T 428/1036* (2015.01)

(58) Field of Classification Search
CPC ............ G02F 1/1337; G02F 1/133703; G02F 1/133788; G02F 1/133723; G02F 2001/133325; G02F 2001/133354; G02F 2001/133726; G02F 2001/133765; C09K 19/56; Y10T 428/10; Y10T 428/1005; Y10T 428/1036
USPC ........... 428/1.1, 1.2, 1.31; 349/93, 182, 187, 349/191; 252/299.4
See application file for complete search history.

(56) References Cited

U.S. PATENT DOCUMENTS

| | | |
|---|---|---|
| 2009/0056853 A1 | 3/2009 | Pai et al. |
| 2014/0010973 A1 | 1/2014 | Gotoh et al. |
| 2014/0198291 A1 | 7/2014 | Saito |
| 2015/0108402 A1 | 4/2015 | Kurihara et al. |

(Continued)

FOREIGN PATENT DOCUMENTS

CN 106833677 A 6/2017

*Primary Examiner* — Ruiyun Zhang

(57) ABSTRACT

The present disclosure relates to a photo-alignment material, a liquid crystal display panel, and a manufacturing method thereof. The chemical structural formulas of photo-alignment material includes an orientation anchor group, a linking group, a photosensitive group with one or more photosensitive cyclohexanone, and an alignment group with a linear or branched alkyl having 3-15 carbon atoms; wherein the orientation anchor group, the linking group, the photosensitive group and the alignment group are connected successively. Through the above-mentioned manner, the present disclosure can simplify the manufacturing process of the liquid crystal display panel, and improve the product quality.

5 Claims, 3 Drawing Sheets

(56) References Cited

U.S. PATENT DOCUMENTS

2015/0299576 A1 10/2015 Fujita
2017/0090251 A1 3/2017 Mizusaki et al.

PHOTO-ALIGNMENT MATERIAL, LIQUID CRYSTAL DISPLAY PANEL, AND MANUFACTURING METHOD THEREOF

CROSS-REFERENCE TO RELATED APPLICATIONS

The present application is a continuation-application of International Application PCT/CN2018/083360, with an international filing date of Apr. 17, 2018, which claims foreign priority of Chinese Patent Application No. 201810164129.4, filed on Feb. 27, 2018 in the State Intellectual Property Office of China, the contents of all of which are hereby incorporated by reference.

TECHNICAL FIELD

Embodiments of the present disclosure generally relate to display technology, and in particular to a photo-alignment material, a liquid crystal display panel, and a manufacturing method thereof.

BACKGROUND

With the continuous development of display technology, the requirements for the performance of liquid crystal displays (LCDs) have also increased continuously, the liquid crystal displays with a large viewing angle have become a focus of researches in result.

In the prior art, in order to obtain the large viewing angle, an alignment film is generally used by disposing on an array substrate and a color filter substrate of a liquid crystal display panel. For VA type liquid crystal display panels, it is also necessary to design the pixel electrode of the array substrate as fish-bone shape, and the monomer which can be polymerized under the irradiation of ultraviolet light should be added to liquid crystal molecules to form a specific pre-tilt angle so that liquid crystals can be aligned while driven. Consequently the manufacturing process is complicated, the alignment film (usually made of polyimide material) is expensive, the requirements for the coating process is severe, and the problems such as the polymerization uniformity and the residual amount of the monomer of polymeric substance will all result in the poor quality of the liquid crystal display panel products.

The inventor of the present disclosure found during the long-term R&D process that the existing manufacturing process of the liquid crystal display panel is complicated and the product quality is poor.

BRIEF DESCRIPTION OF THE DRAWINGS

In order to more clearly illustrate the technical solution in the embodiments of the present disclosure, the accompanying drawings to be used in the description of the embodiments are briefly described below. It will be apparent that the accompanying drawings in the following description are merely embodiments of the present disclosure, and other accompanying drawings may be obtained without creative work for those skilled in the art.

DETAILED DESCRIPTION

The following will clearly and completely describe the technical solutions in the embodiments of the present disclosure with reference to the accompanying drawings in the embodiments of the present disclosure. It is to be understood that the specific embodiments described herein are only used to explain the present disclosure and are not intended to limit the present disclosure. It's obvious that only part but not all of the embodiments related to the present disclosure are provided. All other embodiments obtained based on the embodiments of the present disclosure by those skilled in the art without making creative efforts shall fall within the protection scope of the present disclosure.

Figure 1:
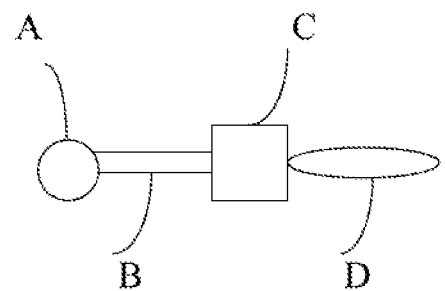
FIG. 1 is a schematic diagram of the structure of a photo-alignment material according to an embodiment of the present disclosure.

Referring to FIG. 1, a schematic diagram of the structure of a photo-alignment material according to an embodiment of the present disclosure is depicted.

The chemical structural formulas of the photo-alignment material may include a first group A, a second group B, a third group C, and a fourth group D connected successively (i.e., in the order of the first group A, the second group B, the third group C, and the fourth group D). The first group A may be an orientation anchor group, the second group B may be a linking group, the third group C may be a photosensitive group with one or more photosensitive chalcone, the fourth group D may be an alignment group of an alkyl with 3-15 carbon atoms, and the alkyl belongs to a straight chain type or a branch chain type. In this embodiment, the orientation anchor group in the photo-alignment material having the orientation anchoring function could be firmly bonded to a substrate of a liquid crystal display panel. The photosensitive group with the photosensitive chalcone could fully polymerize under irradiation of ultraviolet polarized lights and generate a pre-tilt angle in a specific direction. And then the photosensitive group with the photosensitive chalcone may cooperate with the alignment group to induce liquid crystal molecules to deflect toward the direction of the pre-tilt angle. The liquid crystal display panel with large viewing angle may be manufactured by adding the photo-alignment material to the liquid crystal layer, without coating an alignment film on the substrate and etching the pixel electrodes, which may simplify the manufacturing process, be helpful to reduce the costs and improve the product quality.

In one embodiment, the photosensitive chalcone in the third group may be

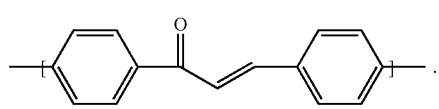

Under the irradiation of lights, the photo-alignment material may be polymerized through the double bond in the photosensitive chalcone and can generate a certain inclination angle. When the light used to irradiate is changed, the inclination of the inclination angle can be changed accordingly. And under the irradiation of polarized lights, the photo-alignment material can incline along the direction of the polarized light to generate the pre-tilt angle of a specific direction In one embodiment, the first group may include one or more of —OH, —NH$_2$,

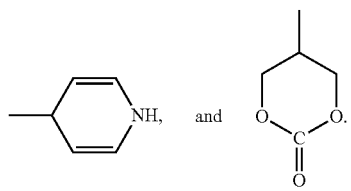

The first group can be bonded to the substrate of the LCD panel by hydrogen bonding or the like, so as to realize the orientation anchoring function.

In the linear or branched alkyl of the fourth group D, one or more —CH$_2$— can be substituted with one or more of phenyl, cycloalkyl, —CONH—, —COO—, —O—CO—, —S—, —CO—, and —CH=CH—; in the linear or branched alkyl of the fourth group D, one or more H atoms may be substituted with one or more halogen atoms. The halogen atom may be an F atom, a Cl atom, or the like. Thus, the fourth group D may have a structure similar to PI (polyimide), which can cooperate with the third group C in the process of the polymerization of the photo-alignment material to deflect along the direction of the inclination angle, so as to induce the liquid crystals to deflect.

The second group B may include one or more of a single bond, a double bond, a triple bond, a phenyl group, a cycloalkyl group, —O—, —S—, —CO—, —CO—O—, —OCO—, —CH$_2$S—, —CF$_2$O—, —OCF$_2$—, —CF$_2$S—, and —(CH$_2$)$_n$—, n=1, 2, 3, or 4; one or more C atoms in the second group B may be selectively substituted with one or more of a phenyl group, a cyclohexyl group, and an alkylene group; one or more H atoms in the second group B may be selectively substituted with one or more halogen atoms. The halogen atom may be an F atom, a Cl atom, or the like. By disposing the second group B between the first group A and the third group C, the problem of weakening the orientation anchoring effect caused by the direct connection between the first group A and the third group C can be avoided.

Furthermore, the chemical structural formula of the photo-orientation material may be:

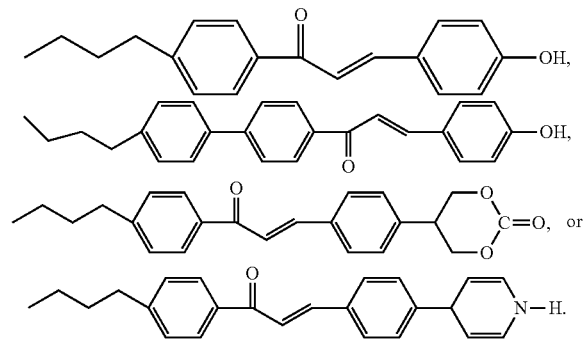

Each of the chemical structural formulas of the photo-alignment materials may include a first group with an orientation anchoring function, a linking group, a third group with one or more photosensitive chalcone and a fourth group with an alignment function, which may be connected successively. Therefore, the liquid crystal display panel with large viewing angle can be manufactured by adding the photo-alignment material to the liquid crystal layer without coating an alignment film on the substrate and etching the pixel electrode, which can simplify the manufacturing process, be helpful to reduce the costs and improve the product quality.

Figure 2:
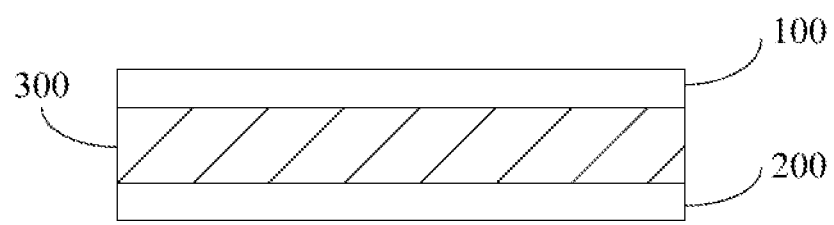
FIG. 2 is a schematic diagram of the structure of a liquid crystal display panel according to an embodiment of the present disclosure.

To solve the above-mentioned problems, another technical solution adopted by the present disclosure may be to provide a liquid crystal display panel. Referring to FIG. 2, a schematic diagram of the structure of a liquid crystal display panel according to an embodiment of the present disclosure may be depicted. The liquid crystal display (LCD) panel may include a first substrate 100, a second substrate 200 disposed opposite to the first substrate 100, and a liquid crystal layer 300 sandwiched between the first substrate 100 and the second substrate 200. The liquid crystal layer 300 may be formed with a liquid crystal mixture including liquid crystal and the photo-alignment material.

In this embodiment, the first substrate 100 and the second substrate 200 may be respectively an array substrate and a color filter substrate in a liquid crystal display panel. The array substrate may include: a plurality of scanning lines; a plurality of data lines intersecting with the plurality of scanning lines to divide the array substrate into a plurality of pixels. In one embodiment, the pixel electrode in each pixel may be a whole electrode without etching to form a specific pattern, for example, a fishbone electrode. In this way, the process of etching the electrode can be omitted, the manufacturing process can be simplified, and the production cost may be reduced.

The liquid crystal mixture included liquid crystals and the photo-alignment material may be sandwiched between the first substrate 100 and the second substrate 200. In the process of photo-alignment, the group in the photo-alignment material with the orientation anchoring function can be firmly bonded to the first substrate or the second substrate of the liquid crystal display panel, the groups with the photo-sensitive chalcone can completely polymerize under irradiation of ultraviolet polarized lights, generate a pre-tilt angle in a specific direction, and cooperate with the alignment group to induce liquid crystal molecules to deflect toward the direction of the pre-tilt angle. The liquid crystal display panel with large viewing angle may be manufactured by adding the photo-alignment material to the liquid crystal layer, without coating an alignment film on the substrate and etching the pixel electrodes, which may simplify the manufacturing process, be helpful to reduce the costs and improve the product quality.

In the liquid crystal mixture, in order to guarantee a more ideal display effect and make the cost controllable, in one embodiment, the weight percentage of the photo-alignment material in the liquid crystal mixture may be 0.1%-5%, for example, 0.1%, 1%, 2%, 3%, 4%, or 5%. Furthermore, in the liquid crystal mixture, the weight percentage of the photo-alignment material may be 3%.

Figure 3:
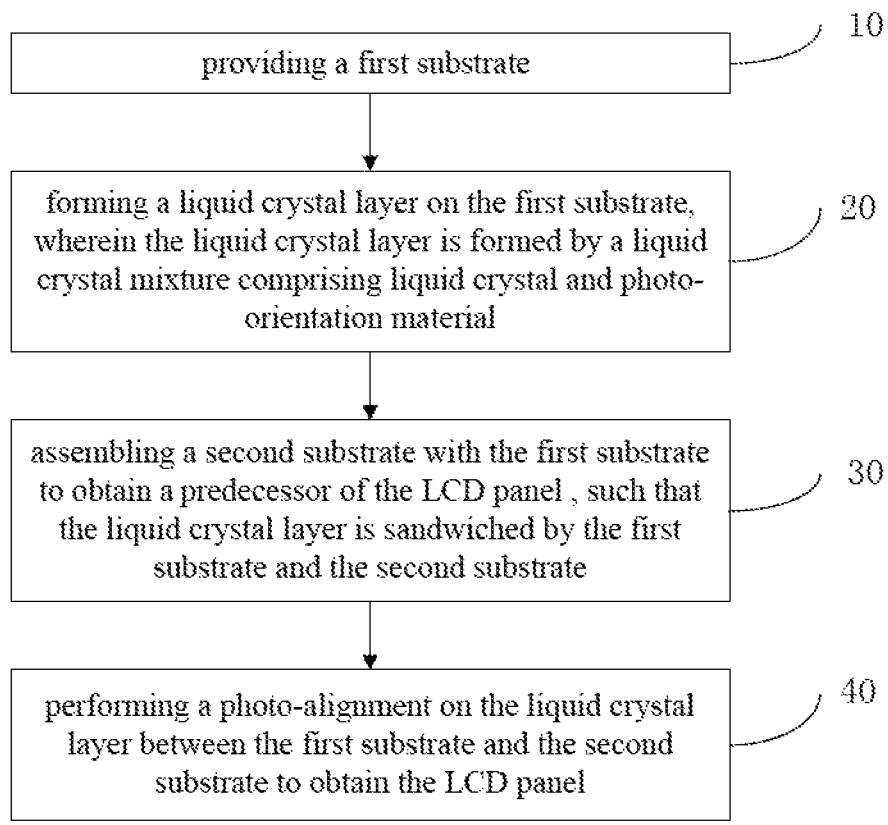
FIG. 3 is a flow chart of a manufacturing method for a liquid crystal display panel according to an embodiment of the present disclosure.

To solve the above-mentioned technical problems, the other technical solution adopted by the present disclosure may be to provide a manufacturing method for a liquid crystal display panel. Referring to FIG. 3, a flow chart of a manufacturing method for liquid crystal display panel according to an embodiment of the present disclosure may be depicted. The method may include the following blocks.

At S10: providing a first substrate.

In block S10, the first substrate may be one of an array substrate and a color filter substrate in a liquid crystal display panel. A conductive adhesive and a sealant may be coated on the first substrate.

At S20: forming a liquid crystal layer on the first substrate, wherein the liquid crystal layer may be formed with a liquid crystal mixture including liquid crystal and photo-orientation material.

In block S20, the liquid crystal mixture may be dropped on the first substrate. The photo-orientation material may include an orientation anchor group, a linking group, a photosensitive group with one or more photosensitive chalcone, and an alignment group with a linear or branched alkyl having 3-15 carbon atoms. The orientation anchor group, the linking group, the photosensitive group and the alignment group are connected successively.

In one embodiment, forming a liquid crystal layer on the first substrate may include: dropping the liquid crystal mixture on the first substrate, and the weight percentage of the photo-orientation material in the liquid crystal mixture may be 0.1%-5%. The thickness of liquid crystal layer may be set according to the display requirements of the liquid crystal display panel. In the liquid crystal mixture, in order to guarantee that a more ideal display effect and make the costs controllable, the weight percentage of the photo-alignment material in the liquid crystal mixture may be 0.1%-5%, for example, 0.1%, 1%, 2%, 3%, 4%, or 5%. In other embodiments, in the liquid crystal mixture, the weight percentage of the photo-alignment material may be 3%.

At S30: assembling a second substrate with the first substrate to obtain a predecessor of the LCD panel, such that the liquid crystal layer may be sandwiched by the first substrate and the second substrate.

In this embodiment, the second substrate may be the other one of the color filter substrate and the array substrate and adhered to the first substrate. The sealant may be solidified. And the first substrate and the second substrate may be adhered in a sealed environment to prevent the air, dust, and the like from being enclosed between the first substrate and the second substrate, such that deteriorate the sealing effect could be avoided.

Before the photo-alignment, since the liquid crystal mixture in the liquid crystal layer may be in a vertical arrangement, the liquid crystal molecules may be also vertically arranged on the substrate.

At S40: performing a photo-alignment on the liquid crystal layer between the first substrate and the second substrate to obtain the LCD panel.

In block S40, the groups in the photo-alignment material with a photosensitive chalcone are sufficiently polymerized through light-irradiating the substrate of the liquid crystal display panel to generate a pre-tilt angle with a specific direction. And then the group with the photosensitive chalcone may cooperate with an alignment group to induce the liquid crystal molecules to deflect toward the direction of the pre-tilt angle.

In one embodiment, performing a photo-alignment on the liquid crystal layer between the first substrate and the second substrate to obtain the LCD panel may include: heating the predecessor of the LCD panel to a temperature above a clearing point of the liquid crystal, and performing the photo-alignment on the liquid crystal layer through an ultraviolet polarized light to obtain the LCD panel with a preset pre-tilt angle.

Figure 4:
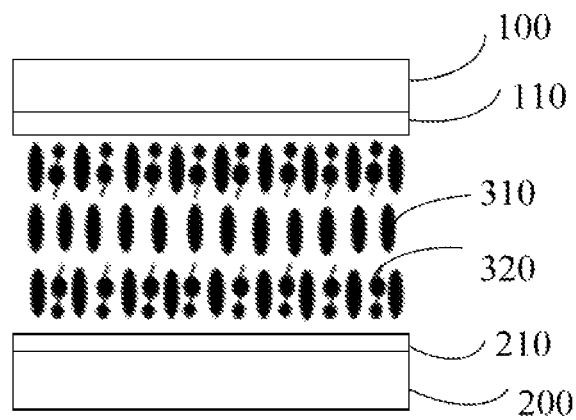
FIG. 4 is a schematic diagram of a liquid crystal display panel in manufacturing process thereof according to an embodiment of the present disclosure, wherein the liquid crystal of the liquid crystal display panel is in a first state.
Figure 5:
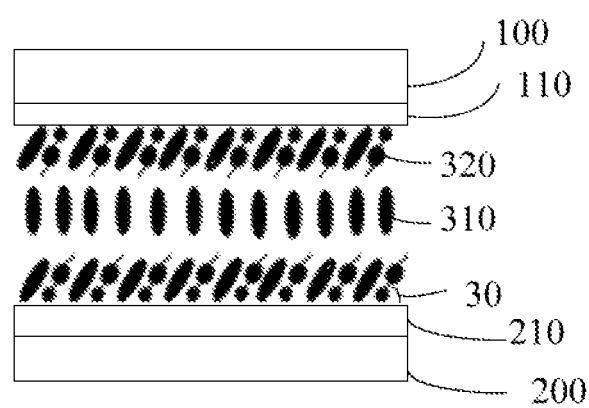
FIG. 5 is a schematic diagram of a liquid crystal display panel in manufacturing process thereof according to an embodiment of the present disclosure, wherein the liquid crystal of the liquid crystal display panel is in a second state.

Referring to FIG. 4, a schematic diagram of a liquid crystal display panel in manufacturing process thereof according to an embodiment of the present disclosure, wherein the liquid crystal of the liquid crystal display panel in a first state may be depicted. Before performing the photo-alignment, since a photo-alignment material 320 in the liquid crystal layer 300 may be in a vertical arrangement, liquid crystals 310 may be also vertically arranged on a conductive layer 110 of the first substrate 100 and a conductive layer 210 of the second substrate 200. The liquid crystal layer may be heated to a temperature above the clearing point of the liquid crystal 310, and the optical alignment may be further performed to the liquid crystal layer through ultraviolet polarized light so as to obtain a liquid crystal display panel with a preset pre-tilt angle. Referring to FIG. 5, a schematic diagram of a liquid crystal display panel in manufacturing process thereof according to an embodiment of the present disclosure, wherein the liquid crystal of the liquid crystal display panel in a second state. may be depicted. In the photo-alignment process of ultraviolet polarized light, the photo-alignment material 320 with a photosensitive chalcone may be polymerized to generate a pre-tilt angle 30 of a specific direction, and cooperate with the alignment group to induce the liquid crystals 310 to deflect toward the direction of the pre-tilt angle.

Liquid crystal may have the characteristic of exhibiting a liquid crystal appearance only in a certain temperature range. Liquid crystal may exhibit a liquid appearance which and almost do not have a fixed shape when being heated to temperature above the clearing point. At this time, the liquid crystals may be accommodated in a space in the photo-alignment material with a certain inclination angle after the inclining. The liquid crystal may be presented to have a shape matching with the space, that is, the liquid crystal may deflect with the photo-alignment material to form a specific pre-tilt angle. In other embodiments, there may be other substrates arranged opposite to the first substrate of the second substrate, such that multiple pre-tilt angles in different directions could be generated in the pixels. Therefore, multi-domain displaying could be realized, and a large viewing angle can be obtained while the color shift phenomenon may be reduced.

The photo-alignment material can polymerize along the direction of an ultraviolet polarized light when being illuminated by ultraviolet polarized light. The inclination of the pre-tilt angle could be adjusted by controlling the energy of the ultraviolet polarized light. In one embodiment, the adjusting of the preset pre-tilt angle can be obtained by changing one or more of the irradiation time of the ultraviolet polarized light, the illuminance of the ultraviolet polarized light, and the wavelength of the ultraviolet polarized light. For example, the energy of the ultraviolet polarized light may be increased through increasing the irradiation time, increasing the illuminance, and the like so as to increase the pre-tilt angle of the liquid crystals. Furthermore, the irradiation time of the ultraviolet polarized light can be 1 minute-60 minutes, for example, 1 minute, 10 minutes, 20 minutes, 30 minutes, 40 minutes, 50 minutes, or 60 minutes. The ultraviolet polarized light may have a wavelength of 320 nm-400 nm, for example, 320 nm, 340 nm, 360 nm, 380 nm, or 400 nm. The ultraviolet polarized light may have an illuminance of 1 $mW/cm^2$-100 $mW/cm^2$, for example, 1 $mW/cm^2$, 10 $mW/cm^2$, 30 $mW/cm^2$, 50 $mW/cm^2$, 70 $mW/cm^{2}$' 100 $mW/cm^2$, and the like.

In summary, the present disclosure may disclose a photo-alignment material, a liquid crystal display panel, and a manufacturing method thereof. The photo-alignment material may include a first group, a second group, a third group, and a fourth group being connected successively. The first group may be a group with an orientation anchoring function, the second group may be a linking group, the third group may be a group with one or more photosensitive chalcone, and the fourth group may be an alignment group with an alkyl having 3-15 carbon atoms, the alkyl may have a straight chain type or a branch chain type. Through the above-mentioned manner, the present disclosure can simplify the manufacturing process of the liquid crystal display panel and improve the product quality.

The above-mentioned embodiments merely represent several examples of the present disclosure, and the description thereof is more specific and detailed, but it should not be considered as limitations to the scope of the present disclosure. It should be noted that, for those skilled in the art, various variations and improvements may be made without departing from the concept of the present disclosure and are all within the protection scope of the present disclosure. Therefore, the protection scope of the present disclosure shall be subject to the appended claims.

What is claimed is:

1. A manufacturing method for liquid crystal display (LCD) panel, comprising:
   providing a first substrate;
   forming a liquid crystal layer on the first substrate, wherein the liquid crystal layer is formed with a liquid crystal mixture comprising liquid crystal and photo-orientation material;
   assembling a second substrate with the first substrate to obtain a predecessor of the LCD panel, such that the liquid crystal layer is sandwiched by the first substrate and the second substrate; and
   performing a photo-alignment on the liquid crystal layer between the first substrate and the second substrate to obtain the LCD panel;
   wherein the chemical structural formula of the photo-orientation material is selected from:

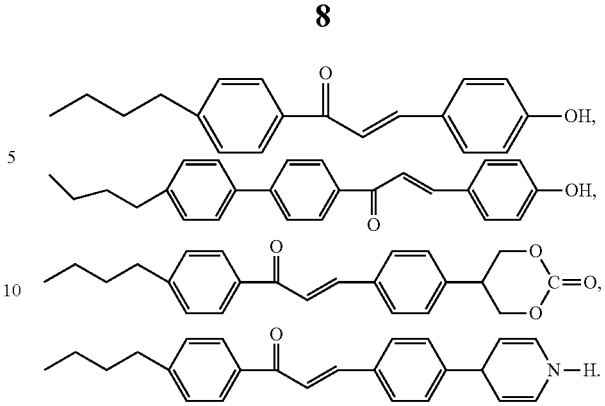

2. The method of claim 1, wherein the performing a photo-alignment on the liquid crystal layer between the first substrate and the second substrate to obtain the LCD panel comprises:
   heating the predecessor of the LCD panel to a temperature above a clearing point of the liquid crystal, and performing the photo-alignment on the liquid crystal layer through an ultraviolet polarized light to obtain the LCD panel with a pre-tilt angle.

3. The method of claim 2, wherein the preset pre-tilt angle can be changed by changing one or more of an irradiation time of the ultraviolet polarized light, an illuminance of the ultraviolet polarized light, and a wavelength of the ultraviolet polarized light.

4. The method of claim 2, wherein the irradiation time of the ultraviolet polarized light is in a range of 1 minute to 60 minutes, the wavelength of the ultraviolet polarized light is in a range of 320 nm to 400 nm, and the illumination of the ultraviolet polarized light is in a range of 1 mW/cm$^2$ to 100 mW/cm$^2$.

5. The method of claim 1, wherein the weight percentage of the photo-orientation material in the liquid crystal mixture is in a range of 1% to 4%.

* * * * *